(12) United States Patent
Kawaguchi et al.

(10) Patent No.: US 6,699,801 B1
(45) Date of Patent: Mar. 2, 2004

(54) CATHODE-RAY TUBE IMPLOSION-PROOF ADHESIVE MESH TAPE AND USES THEREFOR

(75) Inventors: Takeo Kawaguchi, Tokyo (JP); Osamu Shiono, Tokyo (JP); Kazuhiko Tambo, Tokyo (JP)

(73) Assignee: Terraoka Seisakusho Co., Ltd., Tokyo (JP)

( * ) Notice: Subject to any disclaimer, the term of this patent is extended or adjusted under 35 U.S.C. 154(b) by 0 days.

(21) Appl. No.: 09/522,489

(22) Filed: Mar. 10, 2000

(30) Foreign Application Priority Data

Mar. 15, 1999 (JP) .............................. 11-068061

(51) Int. Cl.[7] .............................................. B32B 27/12
(52) U.S. Cl. ............................. 442/2; 442/20; 442/43; 442/45; 442/50; 442/58; 442/64; 442/65; 442/66; 442/149; 442/151; 442/172; 442/180; 428/354
(58) Field of Search ..................... 442/1, 2, 20, 43, 442/45, 50, 58, 64, 65, 66, 149, 151, 172, 180; 428/354

(56) References Cited

U.S. PATENT DOCUMENTS 5,478,639 A * 12/1995 Kawaguchi et al. ........ 428/261

FOREIGN PATENT DOCUMENTS

| CN | 1040567 C | 11/1998 | |
|---|---|---|---|
| JP | 358004248 A | * 1/1983 | ............ H01J/29/87 |
| JP | 1-43791 B | 9/1989 | ............ C09J/7/02 |
| JP | 08203455 A | * 8/1996 | ............ C09J/7/04 |
| JP | 63-24291 B | 5/1998 | ............ H01J/9/24 |

* cited by examiner

Primary Examiner—Ula C. Ruddock
(74) Attorney, Agent, or Firm—Merchant & Gould, P.C.

(57) ABSTRACT

Implosion-proof mesh tape is constructed by covering the surface of a mesh-like fabric matrix with a hot-melt adhesive and then coating it with a pressure-sensitive adhesive. It is thereby possible to obtain a cathode-ray tube with an implosion-proof structure wherein the surfaces of the fiber matrix directly contact with both a metal clamping band and the glass panel.

8 Claims, 3 Drawing Sheets

CATHODE-RAY TUBE IMPLOSION-PROOF ADHESIVE MESH TAPE AND USES THEREFOR

BACKGROUND OF THE INVENTION

1. Field of the Invention

The present invention relates to an adhesive mesh tape for preventing implosion of a cathode-ray tube (hereinafter referred to as "CRT") and to an implosion-proof method and an implosion-proof cathode-ray tube.

2. Description of the Related Art

Since strain is produced in the walls of cathode-ray tubes with unique shapes by the extreme vacuum maintained inside the tubes, reverse strains occur, due to impacts exerted on the front of the cathode-ray tube, that cause bulges in the cathode-ray tube outer surface and eventually breakage, in extreme cases. Current implosion-proof systems for cathode-ray tubes used in television sets and the like achieve reinforcement by applying metal clamping bands onto the outer surface of the tubes.

In such systems, it is necessary for the clamping strength of the clamping band to be effectively transferred to the surface of the cathode-ray tube, and for that purpose an effective and strong adhesive member must be situated between the inside of the clamp band and the surface of the cathode-ray tube. Without provision of such an effective adhesive member, clamping of the band may lead to slipping of the band due to the curvature of the cathode-ray tube surface, thus eliminating the reinforcing effect, or direct contact of the band with the cathode-ray tube surface may damage the surface creating local weak points, or elongation over the entire bulge may be caused in the outer surface of the cathode-ray tube with the corner as the fulcrum, thus presenting a disadvantage whereby a satisfactory implosion-proof function is no longer exhibited.

On the other hand, if an effective adhesive member is present, introduction of cracks at the front of a cathode-ray tube is prevented when it is subjected to impact. Even if a crack is generated at that section, the bulge in the outer surface, produced along with the crack, is limited by a force that will elongate the band at only a very limited section of the perimeter of the crack, and therefore the crack halts directly under the clamp band and breakage is also prevented. Even if the cathode-ray tube were to break, the fragments are held by adhesion with the clamping band, so that scattering of broken glass fragments is kept to an absolute minimum.

As an implosion-proof adhesive, the present applicant (Teraoka Seisakusho K.K.) has already developed and disclosed an adhesive tape prepared by applying a hot-melt adhesive onto one side of a base with a prescribed strength, and applying a pressure-sensitive adhesive onto the other side (Japanese Examined Patent Publication (Kokoku) No. 63-24291). The applicant has also disclosed an adhesive tape prepared by filling inorganic granules of a prescribed particle size into a pressure-sensitive adhesive layer provided on both sides of a tape matrix made of a hot-melt resin (Japanese Examined Patent Publication (Kokoku) No. 1-43791). The applicant has further disclosed an adhesive tape prepared by forming a hot-melt adhesive layer on one side and a pressure-sensitive adhesive layer on the other side of a base matrix which is a union fabric employing natural or synthetic fibers as the warp component and glass filaments as the weft component (Japanese Patent No. 2802878 or U.S. Pat. No. 5,478,639).

While these implosion-proof tapes are being widely used at the current time for implosion proofing of cathode-ray tubes, they are all common adhesive tapes (or tacky or pressure sensitive adhesive tapes) prepared by applying a hot-melt adhesive layer or, onto the entire surface of a base made of a continuous resin film, a pressure-sensitive adhesive layer.

Figure 1:
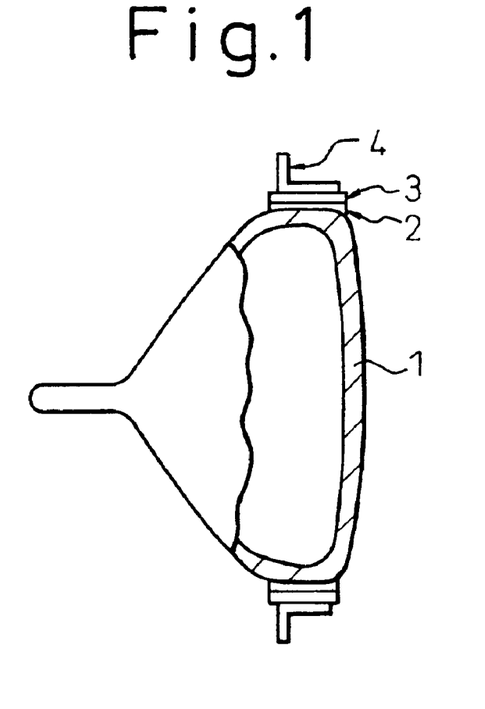
FIG. 1 is a schematic illustration of implosion-proof reinforcement of a conventional cathode-ray tube.
Figure 2:
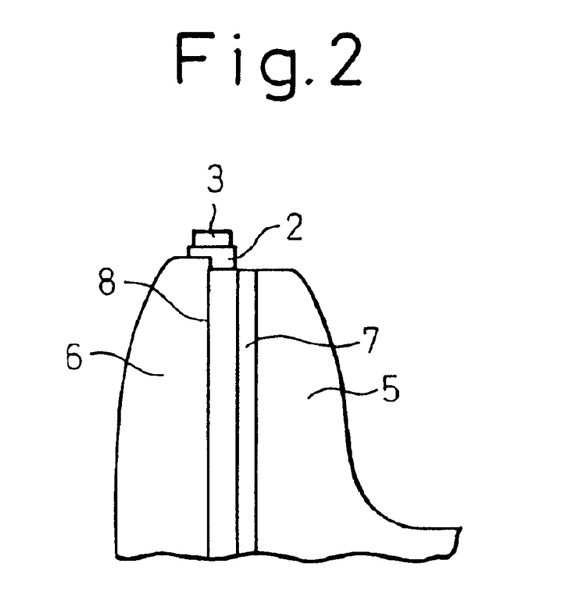
FIG. 2 is an outer cross-sectional view of implosion-proof reinforcement of a conventional cathode-ray tube.

FIG. 1 shows an example of a cathode-ray tube that has been implosion-proofed using this type of implosion-proof adhesive tape. A metal clamping band 3 is shrink-fitted around the perimeter of the side wall of a glass cathode-ray tube 1 via adhesive tape 2. The cathode-ray tube is mounted in a television set or monitor casing (not shown) by a fitting piece 4 mounted on the metal clamping band 3. FIG. 2 shows an outer view of an example of a conventional cathode-ray tube in more detail. The cathode-ray tube is formed by bonding together funnel glass 5 and a glass panel 6 with frit glass 7. The metal clamping band 3 is fitted around the mold match line 8 created during the panel manufacturing step by heating to near the yield point for expansion and insertion and then allowing to cool for clamping by contractile force to provide reinforcement.

With the increasing sizes of cathode-ray tubes and the widening uses of displays in recent years, the spherical surface panel shape of the traditional common cathode-ray tube is gradually being supplanted by completely flat surface shapes or flat surface-type cathode-ray tubes that employ panels with a very nearly flat curvature. Such flat panels have the advantage of no external reflection and also allow easier surface working such as electrical conductive working to eliminate static electricity, or anti-glare working; their production is therefore increasing for large-sized tubes and display tubes.

Flat panels have a higher outer side surface than conventional panels because of their panel structure, while the panel production necessitates an increase in the outer perimeter side angle from the conventional 1° to 5°, for example, as a square pyramid with the surface direction as the apex.

Because of the increased height of the panel outer side with respect to conventional panels, the lug mounting position on the cathode-ray tube cabinet must be much farther to the front than conventional spherical cathode-ray tubes, and since the lug is welded to the metal clamping band, it has been necessary to effect implosion-proof reinforcement at the section near the front of panel outer side surfaces with a large angle and without any such engagement point as the aforementioned mold match line.

When implosion-proof tape with the conventional adhesive layer is applied on this section, considerable slippage occurs due to the clamping force caused by cooling contraction of the clamping band that has been expanded by heating, due to fluidity of the adhesive of the implosion-proof tape when it melts and, in severe cases, the reinforcing band may inconveniently fall off together with the implosion-proof tape.

The present invention, as the result of diligent research aimed at overcoming the problems described above and investigation of the nature of implosion-proof tape for cathode-ray tubes, is the successful development of a cathode-ray tube implosion-proof tape which is economical by comprising only the essential indispensable elements for a cathode-ray tube implosion-proof tape, and which has a completely new structure that provides improved slip properties.

It is therefore an object of the present invention to provide an economical cathode-ray tube implosion-proof tape that comprises only the essential indispensable elements for cathode-ray tube implosion-proofness with no unnecessary components, and which has the necessary adhesive property with excellent slip properties, as well as an implosion-proof method and an implosion-proof cathode-ray tube employing the tape.

SUMMARY OF THE INVENTION

As a result of much diligent research directed toward achieving this object, the present inventors have completed the present invention upon finding the following: The cause of slippage between the metal clamping band and the cathode-ray tube is the fact that the hot-melt adhesive bonding together the glass of the cathode-ray tube and the metal clamping band, the pressure-sensitive adhesive layer for attachment of the implosion-proof tape to the cathode-ray tube, or the tape substrate covered with the hot-melt adhesive, is a continuous layer. A small amount of hot-melt adhesive is sufficient to bond together the metal clamping band and the cathode-ray tube, and therefore that a needless amount of continuous film-like adhesive tape has been used according to the prior art. A suitable fabric-like base matrix instead of granules in a non-continuous dispersion state is suitable to avoid slipping between the metal clamping band and the cathode-ray and damage to the surface of the cathode-ray tube. Moreover, it was also found that if the cathode-ray tube implosion-proof mesh tape is constructed by using a mesh-like fabric as the tape substrate or backing and applying, to the mesh-like substrate, only the absolute minimum necessary amount of hot-melt adhesive and pressure-sensitive adhesive, the cathode-ray implosion-proof tape will consist of only the absolute minimum necessary elements, thus eliminating unnecessary material to not only contribute to lower cost and lighter weight, but also to avoid inhibition of other functions by these extra constituents, for more excellent performance.

The present invention therefore provides the following:

(1) An adhesive mesh tape for preventing implosion of a cathode-ray tube, comprising
a fabric of yarns in the form of mesh having first and second main surfaces;
a hot-melt resin provided on all or a portion of the surface of said fabric; and
a pressure-sensitive adhesive disposed on said first main surface of said fabric.

(2) The adhesive mesh tape according to (1), wherein the total volume of said hot-melt resin and said pressure-sensitive adhesive is less than the volume of the open space of said fabric; so that all said hot-melt resin and said pressure-sensitive adhesive can be incorporated into said open space of said fabric when said adhesive mesh tape is clamped between a cathode-ray tube and a metal clamping band.

(3) The adhesive mesh tape according to (2), wherein the total volume of said hot-melt resin and said pressure-sensitive adhesive is not more than three fourths of the volume of the open space of said fabric.

(4) The adhesive mesh tape according to (3), wherein the total volume of said hot-melt resin and said pressure-sensitive adhesive is not more than the half of the volume of the open space of said fabric.

(5) The adhesive mesh tape according to (1)–(4), wherein at least wefts of said fabric are glass yarns.

(6) The adhesive mesh tape according to (1)–(5), wherein at least part of said fabric is colored black.

(7) The adhesive mesh tape according to (1)–(6), wherein said fabric has a compression breaking strength of not less than 5 kgf/cm.

(8) The adhesive mesh tape according to (1)–(7), wherein said fabric comprises wefts and warps at a density in a range of 5 to 50 yarns per 25 mm and said yarns have a thickness in a range of 50 to 1300 denier.

(9) The adhesive mesh tape according to (1)–(8), wherein said hot-melt resin is coated on said fabric in an amount of 5 to 40 g/m$^2$.

(10) A method for reinforcing a cathode-ray tube to prevent an implosion thereof, said method comprising
preparing a cathode-ray tube having a peripheral portion and covered with a transparent electrically conductive film;
winding an adhesive tape according to claim 1 completely or partly on the peripheral portion of the cathode-ray tube; and
clamping the cathode-ray tube with a metal clamping band around the peripheral portion of the tube and on top of the adhesive tape, by heating the metal clamping band to a temperature of not less than 60° C. and placing the metal clamping band around the adhesion tape and then cooling the metal clamping band to fix the adhesive tape to the peripheral portion of the tube by the metal clamping band.

(11) The method according to (10), wherein said cathode-ray tube has a flat front surface.

(12) The method according to (11), wherein said peripheral portion of said cathode-ray tube has an inclination angle of more than 5°.

(13) A cathode-ray tube comprising a cathode-ray tube body having a peripheral glass portion and covered with a transparent electrically conductive film;
a metal clamping band wound around said peripheral portion of said tube; and
an adhesive mesh tape according to claim 1, lying between said cathode-ray tube and said metal clamping band, wherein all or most of the yarns of said fabric are in direct contact with the glass surface of said tube and/or the metal surface of said metal clamping band and said glass surface of said tube and said metal clamping band are bonded together with the hot-melt resin either through or not through said fabric yarns therebetween.

(14) The cathode-ray tube according to (13), wherein said cathode-ray tube has a flat front surface.

(15) The cathode-ray tube according to (14), wherein said peripheral portion of said cathode-ray tube has an inclination angle of more than 5°.

DESCRIPTION OF THE PREFERRED EMBODIMENTS

The substrate or backing used for the cathode-ray tube implosion-proof mesh tape of the present invention is a mesh-like fabric. If inorganic granules such as disclosed in Japanese Examined Patent Publication No. 1-43791 are used to prevent slippage between the metal clamping band and the cathode-ray tube glass, there is a risk of damage to the glass due to the slippage where there is a considerable angle with the side wall of the cathode-ray tube, and the granules are unsuitable for the tape of the invention since a tape cannot be constructed without a continuous layer of a hot-melt adhesive (resin film). The fabric is preferably a woven fabric, but it may be a nonwoven fabric so long as it is of one piece.

The fabric composing the substrate is not particularly-restricted so long as it is able to withstand pressure and temperature between the metal clamping band and the cathode-ray tube. Specifically, when the metal clamping band is shrink-fitted, it is subjected to a pressure of about 5–40 kgf/cm$^2$ and to heat of generally 200° C. or above, and usually 450–650° C., from a few seconds to a few minutes. Therefore it is sufficient if the fabric can withstand such pressure and heat to remain and prevent direct contact between the metal clamping band and the cathode-ray tube. For example, the yarns of the fabric used may be a monofilament or multi-filament of glass fibers, rayon fibers, polyester fibers, vinylon fibers, acetate fibers, acrylic fibers or the like.

The cathode-ray tube implosion-proof mesh tape of the invention may be used in cases where the outer perimeter side of the panel on which the metal clamping band is mounted is flat, such as the flat panel-type cathode-ray tubes described above, or it may be used on the mold matching lines (protrusions) of cathode-ray tubes, such as conventional cathode-ray tubes. In the latter cases, since a pressure of 15 kgf/cm$^2$ or greater is usually applied, with a pressure of 30 kgf/cm$^2$ or greater on the corner sections, and also considering concentrated stress on the band welding sections or ear mounting sections, it is required for the fabric to be resistant to breakage after the step portion has been subjected to pressure and heat, as mentioned above, during shrink-fitting. For this purpose, the compression breaking strength value is preferably at least 5 kgf/cm.

According to the invention, the "lateral compression breaking strength" of the implosion-proof adhesive tape is defined as tensile strength in the weft direction after pressure application under conditions of a linear step of 0.5 mm and 20 kgf/cm$^2$×10 seconds, as measured for the adhesive tape, by the measuring method described below. The "lateral compression breaking strength" is measured with the weft direction as the lengthwise direction, preparing a 10-mm wide×150-mm long test piece, using a piano wire with a gauge of 0.5 mm and a length of 10 mm as a substitute linear step, setting the piano wire parallel to the warp direction of the test piece, applying pressure with a load or air pressure under conditions of 20 kgf/cm$^2$×10 seconds from the test piece side, with a piston having a 10 mm×10 mm square contact tip, and measuring the tensile strength in the weft direction of the test piece after pressure application, according to JIS Z 0237 (6. Tensile strength and elongation).

The density of the fabric substrate, in the case of a woven fabric, is such that both the warp and weft are in a range of at least 5 to 50 strands per 25 mm, and the weaving is preferably accomplished by a weaving method that maintains cloth openings such as a plain weaving or a leno weaving. A density of lower than 5 strands may lead to yarn fraying or loss of texture, and it may not be possible to obtain sufficient strength against implosion of the cathode-ray tube. Conversely, at greater than 50 strands, the yarn-covering resin will not be sufficiently separated from the adjacent covering resin or pressure-sensitive adhesive and will thus form a layer, leading to a greater than normal temperature fluidity of the resin upon clamping with the metal clamping band, making it impossible to achieve the intended anti-slip effect and prevent reinforcement at the desired clamping location, which may result in a reduced reinforcing effect. A corresponding weight (basis weight) is also suitable for non-woven fabrics.

In the case of woven fabrics, the thickness of the warp/weft strands is appropriate in a range of 50–1300 denier. If the thickness exceeds 1300 denier, the thickness of the fabric increases, making it necessary for the inner perimeter length of the metal clamping band, during shrink-fitting, to increase beyond necessity, and possibly making it impossible to achieve an effective clamping force. At less than 50 denier, it may not be possible to obtain a sufficient anti-slip property, compression breaking strength or cushion effect.

The hot-melt adhesive used for bonding the metal reinforcing band and the CRT panel may be selected from among those which are not tacky even at temperatures of up to 40° C., from the standpoint of preventing problems of outer appearance such as dust adhesion, etc., and those in which covering adhesives are softened and melted and exhibit adhesion when a metal clamping band that has been heat expanded at 450–650° C. and then allowed to cool for contraction is contacted with the adhesive, from the standpoint of preventing adhesion and positional displacement of the metal clamping band. Although there are no particular restrictions on the material thereof so long as it gives a hot-melt resin layer exhibiting such performance, it is preferably a hot-melt resin with a melting point in the range of 50–300° C., and specifically there may be mentioned polyolefin-based, polystyrene-based, ethylene-vinyl acetate-based, polyurethane-based and polyester-based simple, blended or copolymer resins, if necessary in admixture with added tackifying resins or various antioxidants, coloring agents or fillers.

If the melting point of the hot-melt resin is below 50° C. it will be fluid even at a normal temperature so that the anti-slip property will not be adequately exhibited. If the melting point is above 300° C. the hot-melt resin will not have sufficient melt viscosity as the temperature of the heated band instantly falls to below 300° C., and this may render the adhesion inadequate between the panel and band.

The coverage of the hot-melt adhesive (resin) covering the fabric substrate is preferably in the range of 5 g/m$^2$ to 40 g/m$^2$, and the coverage is more preferably 15 g/m$^2$. If the coverage is less than 5 g/m$^2$ the adhesive force with the metal clamping band will be low resulting in a poor ability to hold glass fragments in case of cathode-ray tube implosion, and if it is greater than 40 g/m$^2$, the anti-slip effect will be reduced as in cases where the density of the fabric is such that both the warp and weft exceed at least 50 strands, and this may reduce the clamping or reinforcing effect.

Since the hot-melt adhesive covering the fabric substrate fluidizes with melting upon shrink-fitting, it is sufficient that the hot-melt adhesive be attached to the yarns and does not need to cover the entire surface of the yarns but may only partially cover them, while the covering location is also not limited and does not necessarily need to be on the main surface of the fabric (the surface contacting with the metal clamping band). Furthermore, it is not necessary that all the fabric elements are covered by the same method, and for example, the adhesive may cover only the weft of a union fabric. In most cases, however, it is preferred for the entire surface of the yarns to be covered, or for the surface on the side of the fabric that contacts with the metal clamping band to be covered.

The pressure-sensitive adhesive used for initial adhesion onto the panel exhibits tackiness at normal temperature (10–40° C.) and readily adheres to the outer perimeter of the cathode-ray tube when wrapped around it, and it does not cause peeling or bubbles even at the corner sections or end joints. These properties may be selected from among rubber-based, acrylic-based and silicon-based resin adhesives, when necessary in combination with tackifying resins or crosslinking agents and the like, from the standpoint of cost, tackiness and adhesion, and also in consideration of balance with the elastic modulus of the mesh-like fabric substrate the surface of which is covered with the hot-melt adhesive.

Because the pressure-sensitive adhesive serves for pressure-sensitive adhesion of the tape to the cathode-ray tube before shrink-fitting of the metal clamping band, it must be present on the side of the tape substrate that contacts the cathode-ray tube. It may also be present on the side opposite the side contacting the cathode-ray tube, but this is not necessary and it is instead not preferred because of the risk of causing problems such as dirt accretion after the type is wrapped around the outer perimeter of the cathode-ray tube panel.

In the cathode-ray tube implosion-proof mesh tape of the present invention, the ratio of the total covering volume of the hot-melt adhesive and the pressure-sensitive adhesive to the space volume of the openings between both surfaces of the mesh-like substrate is less than 1, and if possible ¾ or less, more preferably ⅔ or less, and especially ½ or less. If this ratio is adequately low, the hot-melt adhesive and the pressure-sensitive adhesive will be incorporated into the openings of the mesh-like substrate upon shrink-fitting with the metal clamping band, thus making it possible to prevent slipping of the metal clamping band. This ratio is preferably even smaller in order to allow better and more reliable incorporation of the hot-melt adhesive or and pressure-sensitive adhesive into the openings of the mesh-like substrate, or in cases where the fabric undergoes compressive deformation. However, if the ratio is low and the amount of the hot-melt adhesive is too small, the force bonding the metal clamping band and the cathode-ray tube will be weaker, and therefore a larger ratio may be better within a range in which the hot-melt adhesive and the pressure-sensitive adhesive can be incorporated into the openings of the mesh-like fabric substrate. For actual use, therefore, it is preferred for the ratio to be selected as appropriate. When the inclination angle of the outer side of the cathode-ray tube panel is not large, an adequate function as implosion-proof tape will be obtained even if the ratio is greater than 1.

The ratio can be easily adjusted by the size of the openings of the mesh-like fabric substrate or the density of the fabric, and the coverage of the resin, etc.

The matrix fibers, hot-melt adhesive and the pressure-sensitive adhesive composing the implosion-proof mesh tape of the invention are preferably colored black. This will block light from entering through the outer perimeter section of the cathode-ray tube panel, and eliminate a poor appearance around the periphery of the cathode-ray tube panel.

Figure 3:
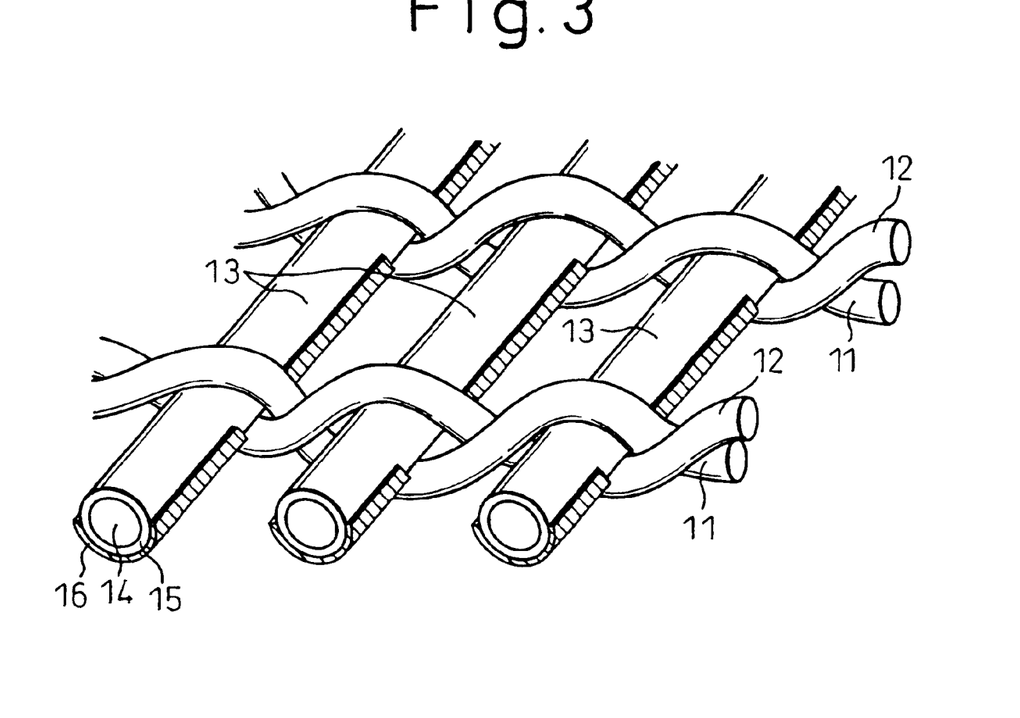
FIG. 3 is a cross-sectional view of implosion-proof adhesive tape for a flat surface tube, having a mesh-like fiber fabric matrix according to the invention.

FIG. 3 is a schematic illustration of an embodiment of cathode-ray tube implosion-proof mesh tape according to the present invention. The substrate consists of a union fabric with warps 11, 12 and weft 13, where the warps 11, 12 are interlaced between the wefts 13. The weft is a monofilament or spun yarn 14 of which the entire surface is covered with a hot-melt adhesive layer 15, while the lower surface of the fabric is covered with a pressure-sensitive adhesive 16. In the illustration of FIG. 3, the hot-melt adhesive layer and the pressure-sensitive adhesive are adhered only to the weft, but in actual use they may also be adhered to the warps, and more specifically, a common mode has the hot-melt adhesive covering the entire surface after forming the woven fabric with weft and the warp, after which the pressure-sensitive adhesive is adhered to one main surface of the woven fabric.

As shown in the drawing, since the size of the openings of the mesh-like tape here is sufficiently large, the hot-melt resin and the pressure-sensitive adhesive both melt instantaneously upon shrink-fitting with the heated metal clamping band and migrate in the openings, so that the surface of the fabric substrate can be exposed to directly contact with the metal clamping band and the cathode-ray tube glass, thus preventing slippage of the metal clamping band due to the resin.

There are no particular restrictions on production method of the implosion-proof adhesive tape of the invention, and for example, the coating of the fabric may be carried out using an air doctor, a blade coater, impregnation, a reverse coater, a gravure coater, a kiss coater, spray coating, a slot orifice coater, extrusion coating or the like, and preferably a mesh-like fabric is coated by immersion in the aforementioned hot-melt adhesive solution dissolved in a solvent, after which a pressure-sensitive adhesive is applied onto one side of the fabric with a gravure roll or the like, and then taken up and cut to the required width. Alternatively, a fabric element may be first coated with a hot-melt adhesive, and it is then prepared into a the woven fabric, followed by coating with a pressure-sensitive adhesive. A silicon-based or non-silicon-based release agent may also be coated onto the opposite side from the pressure-sensitive adhesive side, if necessary.

The obtained implosion-proof adhesive tape may be wound up on a roll and supplied for use.

The implosion-proof adhesive mesh tape of the invention may be adhered to the outer side of a cathode-ray tube panel with the pressure-sensitive adhesive, and a heat-expanded metal clamping band is fitted over the hot-melt adhesive on the back side and then cooled and contracted for shrink-fitting to achieve implosion-proofness and a secure fit.

As explained above, in a cathode-ray tube around which a metal clamping band has been shrink-fitted in this manner via implosion-proof adhesive mesh tape according to the invention, when the total amount of the hot-melt adhesive and the pressure-sensitive adhesive is less than a prescribed amount, they are incorporated into the spaces of the openings of the mesh-like fabric substrate, to produce an implosion-proof cathode-ray tube with a slip-resistant structure wherein the surface of the fabric substrate is directly contacting with both the metal clamping band and the cathode-ray tube glass. A structure wherein the entire surface or most (the majority: half or greater) of the surface of the fabric substrate is in direct contact with the metal clamping band and the glass surface, cannot be achieved with conventional implosion-proof tape. Here, direct contact means that a better slip-resistant effect is exhibited than according to the prior art in which a hot-melt adhesive is placed in between.

However, the implosion-proof mesh tape of the present invention may be applied not only to flat panels but also to conventional curved panels. Particularly when applied to protruding sections, in some cases, all or most of the fabric substrate surface may not be in direct contact with the metal clamping band or the glass surface.

Figure 4:
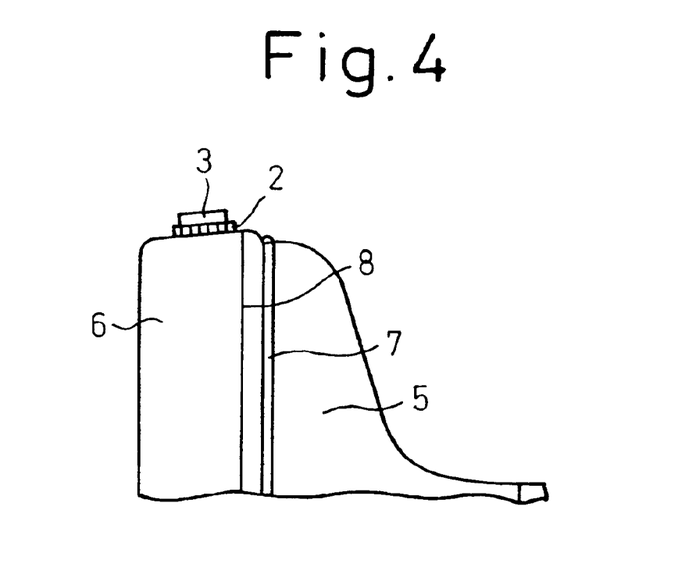
FIG. 4 is an outer cross-sectional view of implosion-proof reinforcement for a flat surface tube according to the invention.
Figure 5:
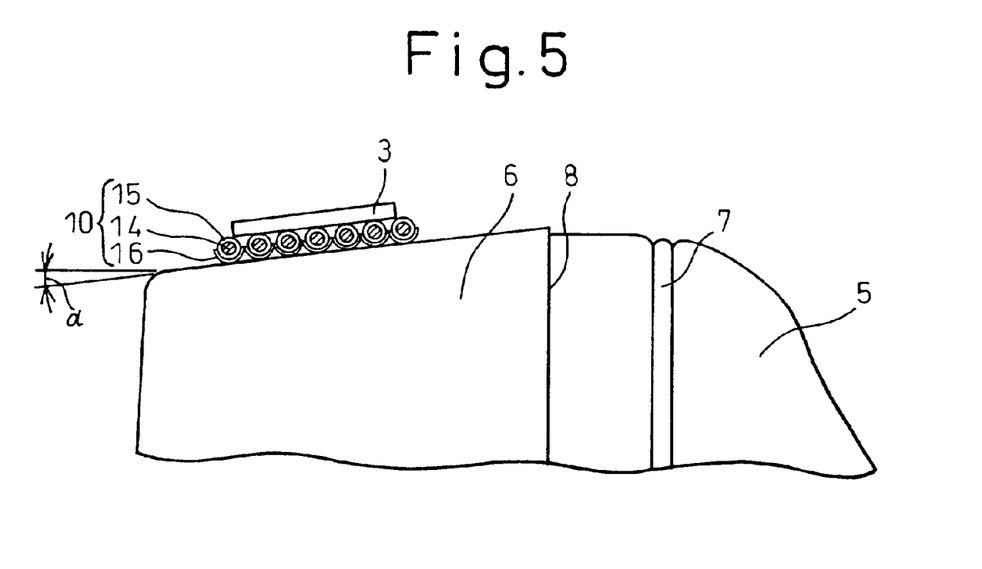
FIG. 5 is a partially magnified cross-sectional view of implosion-proof reinforcement for a flat surface tube according to the invention.

FIG. 4 is an external view of implosion-proof reinforcement of a flat-surface cathode-ray tube according to the invention, and FIG. 5 is a partial magnified view thereof. In these illustrations, the parts corresponding to FIG. 2 are indicated by like reference numerals. FIG. 4 differs from FIG. 2 in that the front side of the panel 6 is flat, the metal clamping band 3 is mounted not on the mold match line 8 but on the flat outer side of the panel 6, and in that the inclination angle α of the outer side of the flat panel is larger (about 5°) than in the case of a conventional spherical panel (about 1°).

FIG. 5 is a schematic illustration of the state of a metal clamping band 3 just prior to being fitted. The implosion-proof mesh tape 10 of the invention comprises a fabric substrate 14, a hot-melt adhesive 15 and a pressure-sensitive adhesive 16 that cover its surface.

Figure 6:
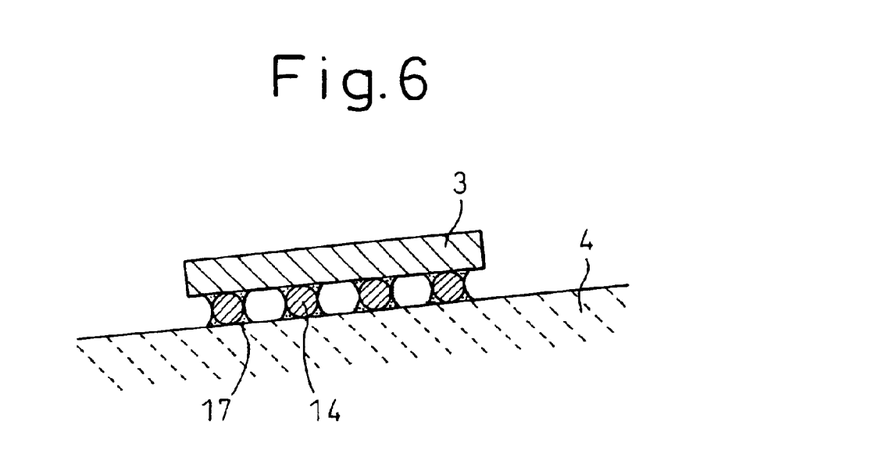
FIG. 6 is a magnified view of the structure for implosion-proof reinforcement according to the invention.

FIG. 6 is a schematic illustration showing the structure after a metal clamping band has been shrink-fitted via an implosion-proof mesh tape. In FIG. 6, the metal clamping band 3 and the glass panel 4 sandwich the yarns of the fabric 14 forming the substrate of the implosion-proof mesh tape 10 in direct contact therewith, and the hot-melt adhesive 15 and pressure-sensitive adhesive 16 form an integral resin 17 that migrates into the openings of the mesh substrate and forms a bond between the metal clamping band 3 and the glass panel, either with or without the fabric substrate lying in between.

According to the invention, when a cathode-ray tube implosion-proof adhesive tape of the invention is wrapped around the outside of the cathode-ray tube panel, it is first affixed to the outer side of the cathode-ray tube panel with the adhesive that is applied to one side of the covering adhesive layer. The heated metal clamping band is then fitted onto the back side of the cathode-ray tube implosion-proof adhesive tape and cooled for contraction to a tight fit. The hot-melt resin covering the surface of the mesh-like fabric melts and flows at this time due to the heat and pressure of the band, and the yarns of the fabric are partially exposed resulting in increased frictional force between the glass panel and the metal clamping band, which prevents potential slipping of the band in the direction of the panel surface while the hot-melt resin provides considerable adhesion between the glass panel and the metal clamping band, thus enhancing the reinforcing effect. Even if the cathode-ray tube were to break by external force, the glass fragments will be held by the strong adhesive force of the hot-melt resin, for an effect that prevents their scattering.

As concerns the anti-slip effect of the invention, since a hot-melt resin covering the surface of yarns such as the warp and weft composing a mesh-like fabric has a smaller absolute coverage than a resin formed into a film, there is only a slight flow distance upon melting of the resin, while because the adhesive layer is formed into a mesh, the resin component that accelerates slipping immediately escapes into the spaces of the mesh while the melted resin is fixed by the internal pressure of the encapsulated space; the flow state upon melting therefore differs fundamentally from a film-like adhesive layer, and an excellent anti-slip effect is exhibited between the metal and glass in addition to the physical friction effect of the mesh-like fabric surface. Here, the slip effect can be evaluated by a taper block test, and for this use it preferably exhibits a value of 200 seconds or longer with heating at 200° C.

The present invention has the advantage of lower cost by exhibiting an effect using less hot-melt resin and pressure-sensitive adhesive than with conventional cathode-ray tube implosion-proof adhesive tape, and also by having a lower density of the mesh-like fabric. The lighter weight tape is also a practically useful effect.

Despite a high adhesive strength, the invention allows the tape to be easily peeled off when salvaging a used cathode-ray tube since the adhesive area is small, and it therefore provides an additional advantage for separation and recovery (salvaging).

EXAMPLES

The present invention will now be explained in greater detail by way of examples which, however, are in no way intended to restrict the invention. The "parts" given below refer to parts by weight.

The following test methods were employed in the examples described below.

(1) Compression Breaking Strength

A 0.5-mm steel wire is attached to the adhesive side of the test tape parallel to the warp direction, pressure of 20 kgf/cm$^2$ is applied to the tape for 10 seconds, and then the tensile strength of the tape in the weft direction is measured.

(2) Taper Block Test

A 25 mm×25 mm test tape piece is pasted onto the lower inclined surface of a combination of two iron square rod blocks, upper and lower, having an inclination angle of 5°.

The upper block is preheated to 200° C. or 300° C., and then the lower block is subjected to pressure at 1.2 kgf/cm$^2$ perpendicular to the head, and the time required for the lower block to shift 10 mm is measured with a displacement measuring instrument.

(3) Band (Metal Clamping Band) Shifting

Implosion-proof treatment: After winding one round of a test tape along the outer perimeter side of a flat cathode-ray tube, a metal band ring heated to 450° C. is fitted thereon for implosion-proof treatment. During this time it is observed whether or not the band slips from the test tape layer by the tensile force of fitting.

After heat cycle: An implosion-proof treated test sample is subjected to 10 cycles of 5 hours at −45° C. followed by 5 hours at +80° C., and any slipping thereof is observed.

(4) Adhesive Residue After Salvaging

An implosion-proof treated flat cathode-ray tube is immersed for 10 minutes in hot water at 40° C., and the band is cut and the degree of adhesive residue is examined.

(5) Missile Test

A steel sphere with a weight of 500 g is dropped from a height of 1.5 m at a position over the panel side of an implosion-proof treated flat cathode-ray tube, and the number of cracks running through the band is examined.

(6) Glass Fragment Holding Rate

After dropping an implosion-proof treated flat cathode-ray tube from a height of 1.5 m with the panel side facing downward to break the cathode-ray tube, the holding rate of glass fragments adhered to the band (judged by visual examination of the area of glass fragments adhered in relation to the area of the entire band) is calculated.

Example 1

As the mesh-like woven fabric there was used a leno woven glass cloth with a thickness of 0.12 mm, a weave density of 10+10/25 mm in the warp direction (thread size: 300 denier) and 10/25 mm in the weft direction (thread size: 600 denier), and which was subjected to sizing treatment with blackened vinyl chloride. Here, the weave density of "10+10/25 mm" in the warp direction represents a leno weave of two warps at a spacing of 10 per 25 mm (same hereunder).

The glass cloth was impregnated with a mixed solution prepared by dissolving 30 parts of a saturated copolymer polyester resin with a softening point of 120° C. in 100 parts of toluene, and then drawn, while avoiding blocking of the mesh, and dried to fabricate a hot-melt resin covered mesh-like woven fabric with a dry coverage of 15 g/m².

A gravure coater was used to apply and dry an adhesive solution prepared by dissolving 100 parts of a pressure-sensitive adhesive resin and 10 parts of oil with 100 parts of natural rubber in 1000 parts of toluene 4=onto one side of the covered fiber fabric, and this was wound up on a cardboard tube to prepare an implosion-proof adhesive tape with a finishing thickness of 0.24 mm.

This implosion-proof adhesive tape was cut to a prescribed width and used for wrapping of a 29-inch flat. cathode-ray tube, for an adhesive tape property and wrapping test. The inclination angle of the outer side of the flat cathode-ray tube panel was 5°.

The results are shown in Table 1.

In Example 1, the tape had pressure-sensitive properties with no problems when used with a taping machine while also having adequate compression breaking strength and anti-slip properties (taper block test, band shifting), thus confirming that the tape exhibited sufficient implosion-proof properties with absolutely no shifting.

Example 2

A gravure coater was used to coat and dry a mixed solution of the same saturated copolymer polyester resin as in Example 1 onto one side of the same mesh-like fabric as in Example 1 to a dry coverage of 15 g/m², while a gravure coater was also used to coat and dry the same pressure-sensitive adhesive as in Example 1 onto the opposite side, to prepare an implosion-proof adhesive tape with a finishing thickness of 0.24 mm; the results of the same evaluation are shown in Table 1.

The same satisfactory performance was achieved as in Example 1.

Example 3

The same system was used for impregnation and coating of the same hot-melt resin (coverage: 15 g/m²) and pressure-sensitive adhesive as in Example 1 onto the surface of a mesh-like woven fabric which was a union fabric with a thickness of 0.24 mm and a weave density of 16+16/25 mm in the warp direction (thread size: size 20) with blackened rayon fibers and 16/25 mm in the weft direction (thread size: 600 denier) with glass fibers, to prepare an implosion-proof adhesive tape with a finishing thickness of 0.36 mm; the results of the same evaluation are shown in Table 1.

The same satisfactory performance was achieved as in Example 1.

Comparative Example 1

An extruder was used for lamination working of a polyolefin-based hot-melt resin with a softening point of 85° C. onto one side of the same mesh-like woven fabric as in Example 1 to a coverage of 60 g/m², after which the same pressure-sensitive adhesive as in Example 1 was applied to the opposite side with a roll coater to a finishing thickness of 0.24 mm to prepare a comparison adhesive tape which was then evaluated in the same manner as Example 1 giving the results shown in Table 1. This structure was disadvantageous in that it resulted in shifting of the band.

Comparative Example 2

After the same lamination working as in Comparative Example 1 onto the same mesh fabric as in Example 3, the same pressure-sensitive adhesive as in Example 1 was applied to the opposite side with a roll coater to a finishing thickness of 0.36 mm to prepare a comparison adhesive tape which was then evaluated in the same manner as Example 1 giving the results shown in Table 1. This structure gave disadvantageous results similar to Comparative Example 1.

Comparative Example 3

After coating one side of a 0.009-mm thick polyester film with the same pressure-sensitive adhesive as in Example 1 to a thickness of 0.015 mm using a roll coater, the same mesh-like woven fabric as in Example 1 was pasted onto the tacky side, and the same pressure-sensitive adhesive as in Example 1 was further coated and dried thereon to a finishing thickness of 0.24 mm to prepare a comparison adhesive tape which was then evaluated in the same manner as Example 1 giving the results shown in Table 2. The results were disadvantageous similar to Comparative Example 1.

Comparative Example 4

A 0.075-mm thick polyester film was coated with a pressure-sensitive adhesive composition comprising 10 parts of silicon oxide with a mode particle size (particle size having the maximum content) of 0.050 mm and a maximum particle size of 0.125 mm, combined with 100 parts in terms of solid portion of the same pressure-sensitive adhesive as in Example 1, to prepare a comparison adhesive tape with a finishing thickness of 0.24 mm which was then evaluated in the same manner as Comparative Example 1 giving the results shown in Table 2. There were problems with the anti-slip property and implosion-proof effect, including considerable shifting and a large number of cracks observed in the missile test.

Comparative Example 5

As the mesh-like woven fabric there was used a blackened sizing-treated plain woven glass cloth with a thickness of 0.12 mm, a weave density of 53/25 mm in the warp direction (thread size: 300 denier) and 57/25 mm in the weft direction (thread size: 600 denier), that had been covered by the same method and with a saturated copolymer polyester resin of the same material as in Example 1 to a coverage of 15 g/m², while on the opposite side there was coated and dried the same material as in Example 1 by the same method, to prepare a comparison adhesive tape with a finishing thickness of 0.24 mm which was then evaluated in the same manner as Example 1 giving the results shown in Table 2. The results were disadvantageous similar to Comparative Example 1.

Comparative Example 6

A gravure coater was used to coat the same pressure-sensitive adhesive as in Example 1 onto the side opposite the laminated layer of the same laminated mesh-like fabric as in Comparative Example 1, only on the threads of the mesh fabric, to prepare a comparison adhesive tape with a finishing thickness of 0.24 mm which was then evaluated in the same manner as Example 1 giving the results shown in Table 2. The results were disadvantageous similar to Comparative Example 1.

exhibit an excellent effect of implosion-proof reinforcement for flat-surface cathode-ray tubes. Furthermore, since the adhesive layer is only partial, it is excellently suited for salvaging and offers the advantage of high utility in the separation and recovery of cathode-ray tubes.

TABLE 1

Adhesive properties and slip properties, compressive/shear adhesive force and wrapping test results for adhesive tapes

| Parameters | Example 1 | Example 2 | Example 3 | Comp. Ex. 1 | Comp. Ex. 2 |
|---|---|---|---|---|---|
| Finishing thickness [mm] | 0.24 | 0.24 | 0.36 | 0.24 | 0.36 |
| Compression breaking strength [kgf/cm] | 17.5 | 17.4 | 23.0 | 19.0 | 24.8 |
| Adhesive force on SUS plate | | | | | |
| 180° release force [gf/cm] | 150 | 160 | 250 | 630 | 660 |
| Shear adhesive force [kgf/cm$^2$] | 14.2 | 14.0 | 17.3 | 15.8 | 19.2 |
| Adhesive force on glass plate | | | | | |
| 180° release force [gf/cm] | 140 | 140 | 230 | 600 | 590 |
| Shear adhesive force [kgf/cm$^2$] | 12.3 | 12.1 | 15.5 | 13.9 | 16.9 |
| Taper block test [sec] | | | | | |
| 200° C. | no shifting | no shifting | no shifting | 182 | 133 |
| 300° C. | no shifting | no shifting | no shifting | 66 | 42 |
| Wrapping test | | | | | |
| Band shifting | | | | | |
| Implosion-proof treatment | ○ | ○ | ○ | X | X |
| After heat cycle | ○ | ○ | ○ | X | X |
| Adhesive residue after salvaging | ○ | ○ | ○ | Δ | Δ |
| Missile test [number] | 4 | 4 | 3 | 4 | 3 |
| Glass fragment holding rate [%] | 90 | 90 | 90 | 95 | 95 |

TABLE 2

| Parameters | Comp. Ex. 3 | Comp. Ex. 4 | Comp. Ex. 5 | Comp. Ex. 6 |
|---|---|---|---|---|
| Finishing thickness [mm] | 0.24 | 0.24 | 0.24 | 0.24 |
| Compression breaking strength [kgf/cm] | 18.8 | 12.5 | 42.3 | 16.3 |
| Adhesive force on SUS plate | | | | |
| 180° release force [gf/cm] | 680 | 680 | 490 | 520 |
| Shear adhesive force [kgf/cm$^2$] | 15.0 | 16.0 | 23.7 | 11.3 |
| Adhesive force on glass plate | | | | |
| 180° release force [gf/cm] | 690 | 650 | 460 | 510 |
| Shear adhesive force [kgf/cm$^2$] | 13.1 | 13.0 | 26.0 | 10.2 |
| Taper block test [sec] | | | | |
| 200° C. | no shifting | no shifting | 105 | 121 |
| 300° C. | 76 | 57 | 42 | 56 |
| Wrapping test | | | | |
| Band shifting | | | | |
| Implosion-proof treatment | X | X | X | X |
| After heat cycle | X | X | X | X |
| Adhesive residue after salvaging | Δ | Δ | Δ | Δ |
| Missile test [number] | 5 | 9 | 2 | 4 |
| Glass fragment holding rate [%] | 95 | 80 | 95 | 95 |

The implosion-proof adhesive tape of the present invention offers not only advantages of economy and light weight since it comprises only the minimum essential elements for implosion-proof adhesion use and uses no unnecessary components, but also exhibits excellent performance without slipping and therefore exhibits high anti-slip properties and a powerful effect of adhesion between metal bands and glass even on inclined panel outside surfaces, and can

What is claimed is:
1. An adhesive mesh tape for preventing implosion of cathode ray tube, comprising:
 a fabric of yarns in the form of mesh having first and second main surfaces and having open spaces between yarns;
 a hot-melt resin provided on all or a portion of the yarns of said fabric; and a pressure-sensitive adhesive provided on the surfaces of the yarns of said fabric on a side of said first main surface of said fabric;

wherein said hot-melt resin and said pressure-sensitive adhesive do not continuously cover the entire surface of said tape and have opening above or below said open spaces of said fabric and wherein the total volume of said hot-melt resin and said pressure-sensitive adhesive is less than the volume of open spaces of said fabric.

2. The adhesive mesh tape according to claim 1, wherein the total volume of said hot-melt resin and said pressure-sensitive adhesive is not more than three fourths of the volume of the open spaces of said fabric.

3. The adhesive mesh taps according to claim 3, wherein the total volume of said hot-melt resin and said pressure-sensitive is not more than half of the volume of the open spaces of said fabric.

4. The adhesive mesh tape according to claim 1, wherein at least wefts of said fabric are glass yarns.

5. The adhesive mesh tape according to claim 1, wherein at least part of said fabric is colored black.

6. The adhesive mesh tape according to claim 1, wherein said fabric has a compression breaking strength of not less than 5 kgf/cm.

7. The adhesive mesh tape according to claim 1, wherein said fabric comprises wefts and warfs at a density in a range of 5 to 50 yarns per 25 mm and said yarns have a thickness in a range of 50 to 1300 denier.

8. The adhesive mesh tape according to claim 1, wherein said hot-malt resin is coated on said fabric in an amount of 5 to 40 g/m$^2$.

* * * * *